Figure 1:
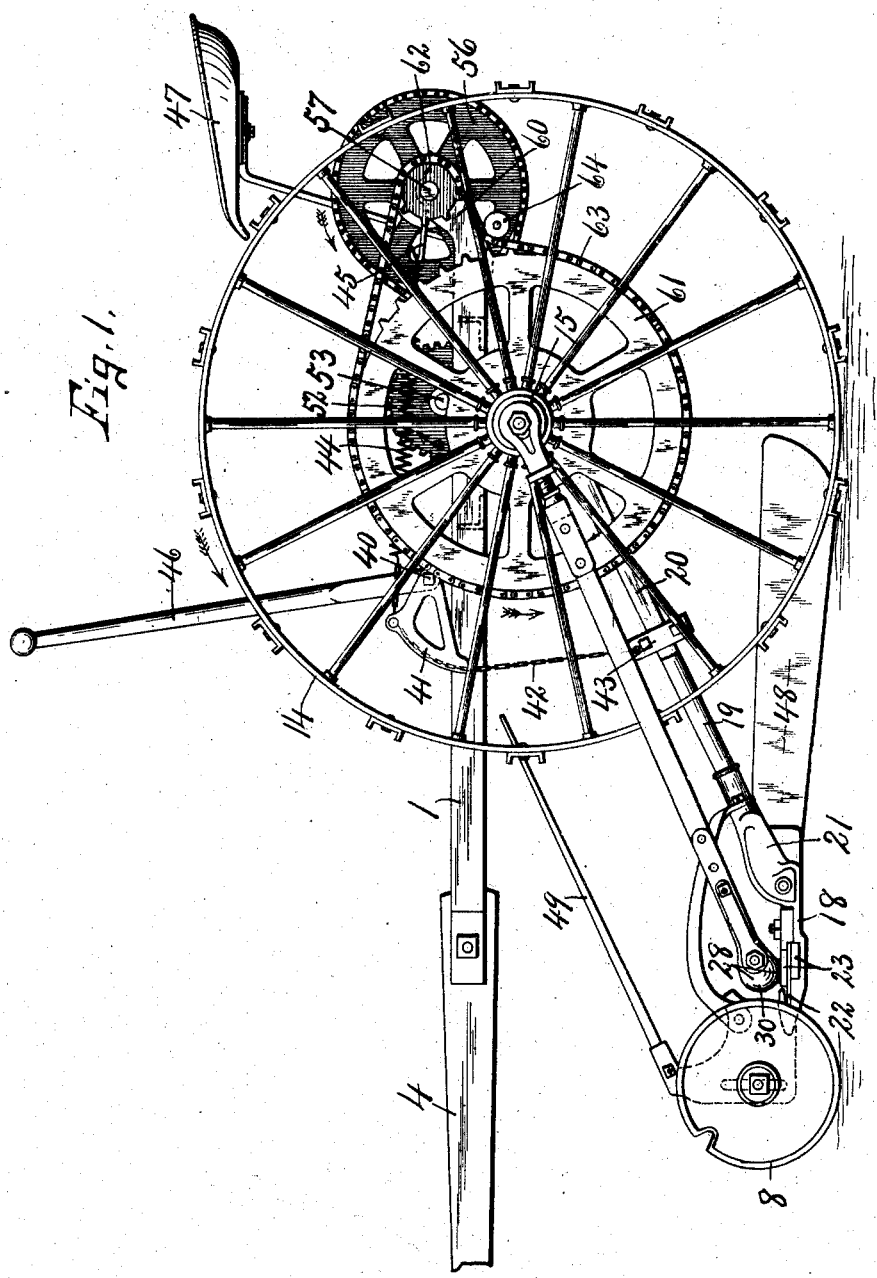

W. E. GILROY.
MOWING MACHINE.
APPLICATION FILED NOV. 20, 1906.

927,460.

Patented July 6, 1909.
5 SHEETS—SHEET 1.

Witnesses.

Inventor.
W. E. Gilroy
By Howard P. Dinson
Attorney.

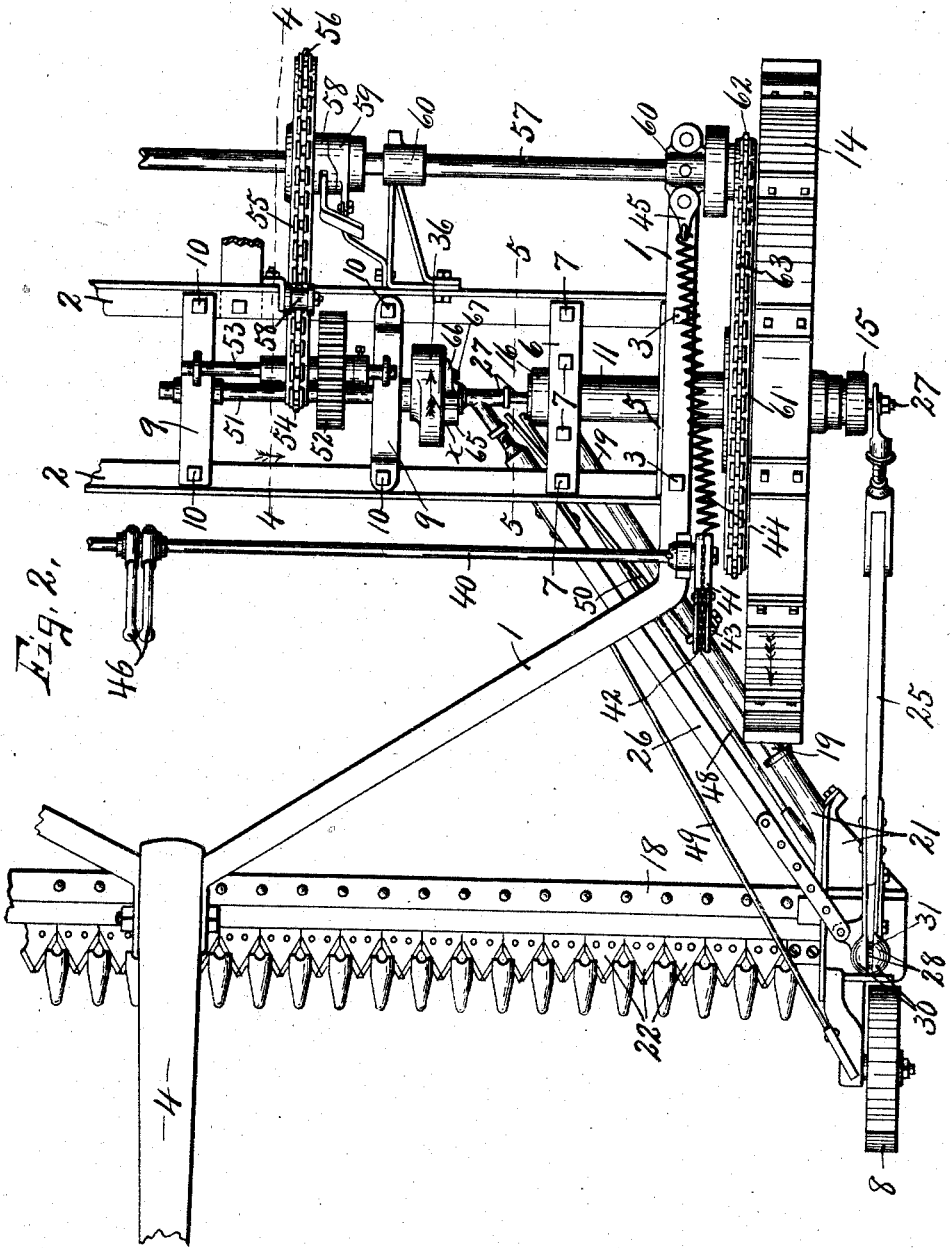

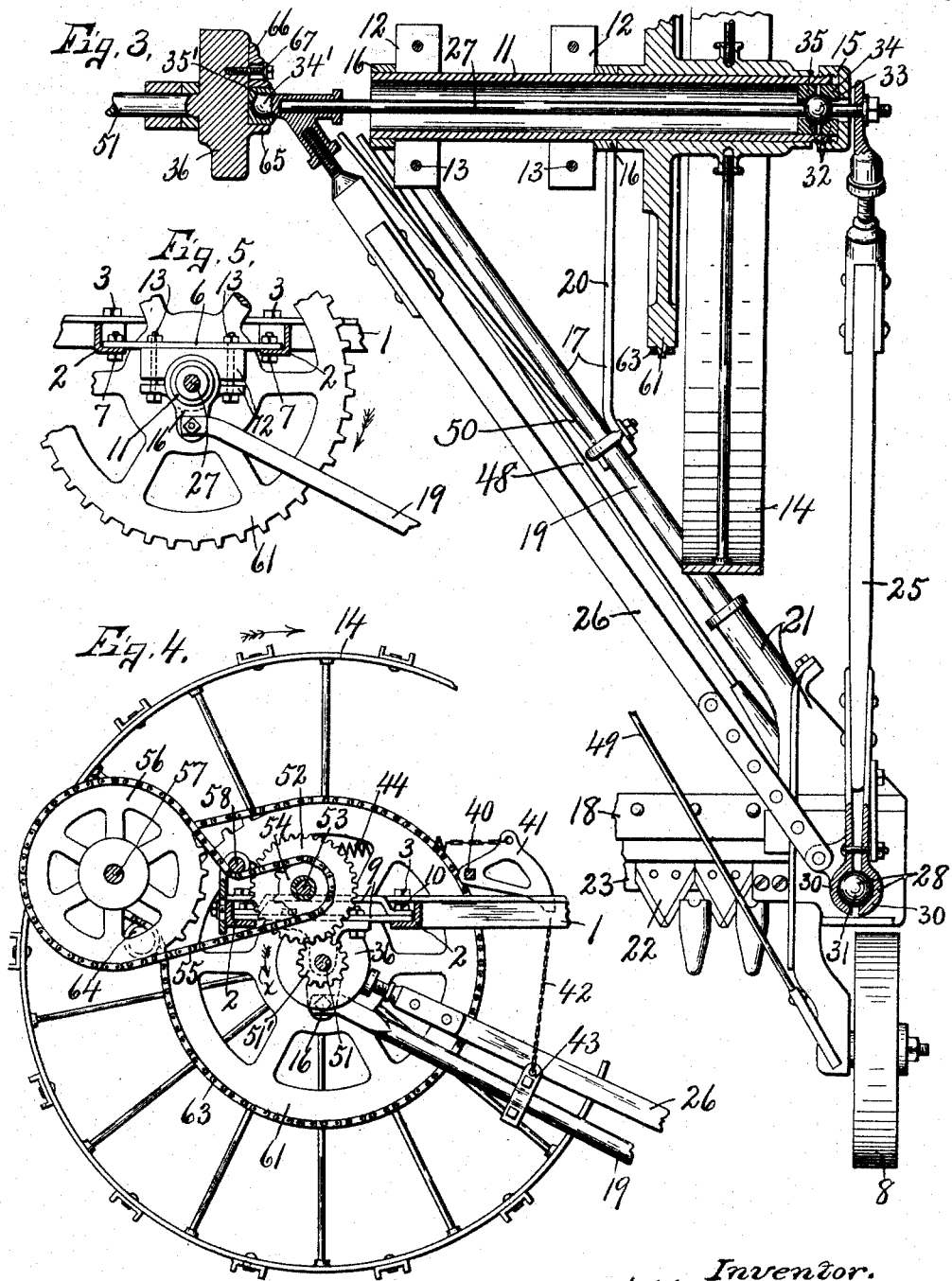

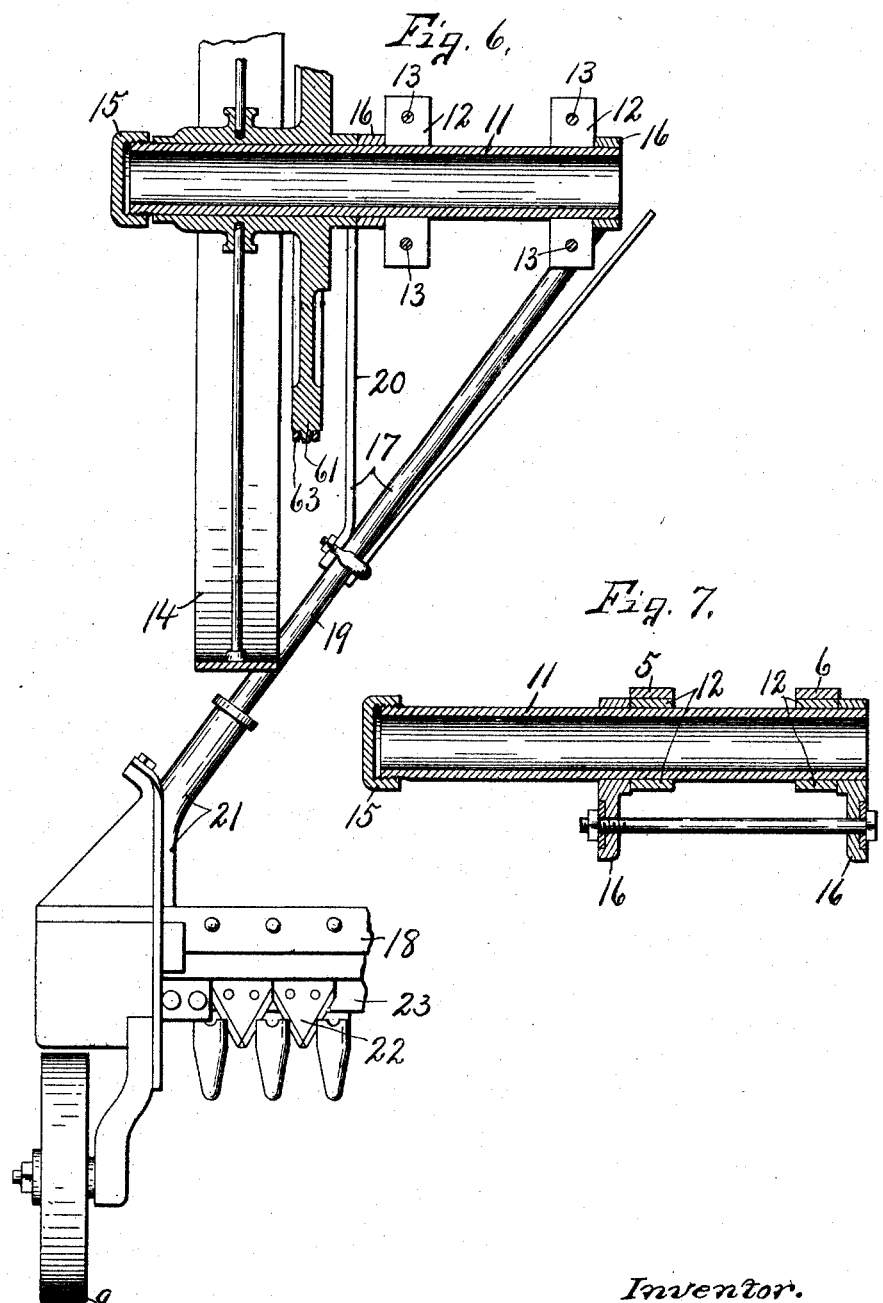

W. E. GILROY.
MOWING MACHINE.
APPLICATION FILED NOV. 20, 1906.
927,460.
Patented July 6, 1909.
5 SHEETS—SHEET 5.
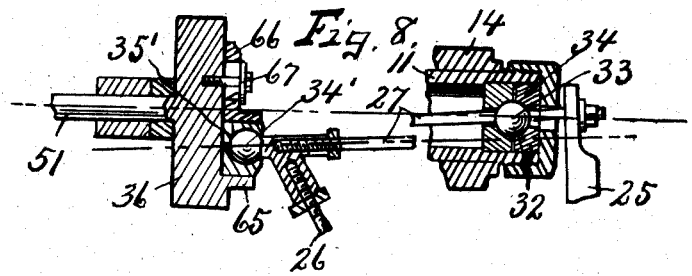
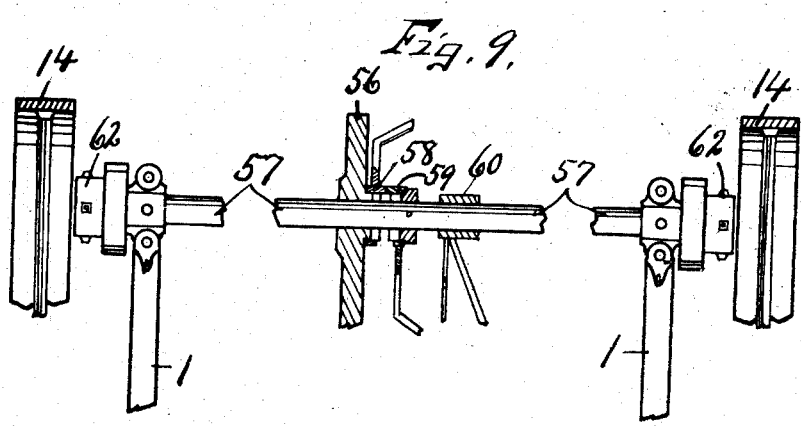
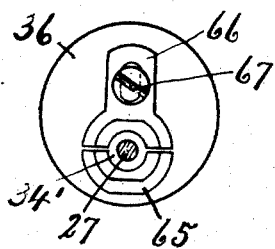
WITNESSES.
H. J. Baringer
H. E. Chase
INVENTOR
W. E. Gilroy
BY
Howard P. Denton
ATTORNEY.

UNITED STATES PATENT OFFICE.

WILLIAM E. GILROY, OF UTICA, NEW YORK.

MOWING-MACHINE.

No. 927,460.  Specification of Letters Patent.  Patented July 6, 1909.

Application filed November 20, 1906. Serial No. 344,213.

*To all whom it may concern:*

Be it known that I, WILLIAM E. GILROY, of Utica, in the county of Oneida, in the State of New York, have invented new and useful Improvements in Mowing-Machines, of which the following, taken in connection with the accompanying drawings, is a full, clear, and exact description.

This invention relates to certain improvements in mowing machines of the center-draft type, similar to that shown in patent to Simmons, 610,287, September 6, 1898.

My main object is to mount the finger-bar which supports the reciprocatory knife-bar upon what may be termed a floating vertically movable frame independently of the driving mechanism so that the finger-bar may ride over uneven surfaces and obstructions without affecting in any way the speed of action of the knife-bar or its actuating mechanism. Or in other words, the actuating mechanism is mounted upon the main supporting frame in fixed relation thereto with the single exception of the laterally oscillating driving element for reciprocating the knife-bar, which element is hinged in the axis of oscillation of the finger-bar supporting frame, and is therefore adapted to move therewith when the finger-bar is riding over uneven surfaces or obstructions.

A second object, therefore, is to hinge the vertically movable floating frame or finger-bar and the laterally oscillating knife actuating frame in substantially the same axis coincident with the traction wheels and main driving gear separately from the driving gears.

A further object is to actuate the knife-bar through the medium of a laterally movable triangular frame having one of its sides passing through and journaled within one of the axle sections.

Other objects and uses relating to the specific structures of the various mechanisms will be brought out in the following description.

In the drawings—Figure 1 is a side elevation of a center-draft mowing machine of the reciprocating cutter type embodying the various features of my invention. Fig. 2 is a top plan of substantially one-half of the machine, showing particularly the main supporting frame and knife-bar thereon, together with the actuating mechanism for reciprocating the knife-bar along the finger-bar. Fig. 3 is an enlarged horizontal sectional view through one of the tubular axle sections showing the floating finger-bar-frame and triangular knife-bar-actuating frame having one side passing through and journaled within the tubular axle section. Figs. 4 and 5 are sectional views taken respectively on lines 4—4, and 5—5, Fig. 2. Fig. 6 is a horizontal sectional view similar to Fig. 3 of the opposite side of the mowing machine. Fig. 7 is a vertical sectional view through the tubular axle section. Fig. 8 is a detailed sectional view partly broken away showing the eccentric and adjacent portions of the triangular frame connected thereto, and also showing the right hand bearing for said triangular frame. Fig. 9 is a top plan partly in section and partly broken away, of the counter shaft at the rear of the eccentric shaft, showing the clutch and portions of the traction wheels in section. Fig. 10 is an end face view of the eccentric showing the adjacent portion of the triangular frame in section.

The main supporting frame consists preferably of opposite side bars —1— and parallel transverse bars —2— which are secured at the ends to the side bars —1— by suitable fastening means, as bolts —3— forming a rectangular open frame, said bars having their front ends converging forwardly toward the longitudinal center of the machine for receiving between them a pole —4— the latter being in the center-line of draft of the machine. The bars —1— and 2 are preferably made of wrought angle-iron to afford lightness and strength. Rigidly secured to the opposite ends of the bars —2— are separate pairs of comparatively short reinforcing braces or plates —5— and —6—, the brace —5— being held in place by the bolts —3—, while the brace —6— is secured to the bars —2— by clamping bolts —7—. The central portion of the main frame is further reinforced by additional cross braces —9— having their ends secured to the bars —2— by suitable fastening means, as bolts —10—, said braces —5—, 6— and —9— constituting parts of the main frame.

A pair of separate tubular axle sections —11— are secured co-axially in the opposite ends of the main frame and preferably to the bars —5— and 6— by suitable clamping members —12—, which are drawn together against opposite faces of the axle sections and secured to the bars —5— and —6— by bolts 13—. These tubular axle sections are comparatively short and are rigidly connected to and become a part of the main frame, although capable of being removed independently of each other by simply loosening the clamping bolts —13— and permitting the axle sections to be withdrawn endwise. These tubular axle sections project some distance beyond the opposite ends of the frame for receiving and supporting suitable traction wheels 14— which rotate thereon and are held against endwise displacement by screw caps 15— fitting over and upon the threaded outer ends of the tubular axle sections —11—.

Journaled upon each tubular axle section is a pair of rock-arms —16— for receiving and supporting one end of vertically swinging frames —17— which extend forwardly and downwardly and support at their front ends a finger-bar —18— carrying the usual guard fingers. Each vertically swinging element —17— comprises essentially a thrust-bar —19— and a brace —20—, the thrust-bar —19— being secured to the inner rock-arm —16— below its axis and has its forward end secured to, but turnable on a bracket —21— carrying one end of the finger-bar —18—. The thrust-bars —19— extend downwardly and outwardly from each other from their respective rock-arms —16— and terminate in the brackets —21— which are located just outside of the line of travel of the traction wheels and support suitable ground wheels —8— some distance in advance of but at the outside of the line of travel of the traction wheels, leaving a clear intervening space between the ground wheels —8— for the operation of the cutting knives 22. These cutting knives are made up in sections in the usual manner and are secured by suitable rivets or other fastening means to a knife-bar —23— which is guided in the finger-bar —18—. This knife-bar —23— is connected and adapted to be reciprocated by a laterally oscillating triangular frame composed of side bars —25— 26— and an end bar —27— which is passed through one of the tubular axle sections —11—, and therefore, through the center of the adjacent traction wheel —14—.

The knife-bar —18— is connected at one end by a universal joint —28— to the apex of the triangular frame composed of bars —25, —26— and —27—, the bar —25— extending in the direction of the line of draft just outside of the wheel and has one end removably connected to the outer end of the bar —27— and its front end is provided with opposed clamping jaws —30— forming a socket for receiving the ball, as —31—, of a universal joint, which ball is in this instance, secured to the extreme outer end of the knife-bar.

The bar 26— connects the front end of the bar 25— with the inner end of the bar —27— at the inner end of the tubular shaft —11—. This bar —27— extends entirely through and beyond the opposite ends of the tubular axle —11— in which it is adapted to oscillate upon a co-axial universal joint or bearing —32— within and near the extreme outer end of the axle section —11—. In this particular instance, the rod —27— is provided near its outer end with a ball —33—, which is seated in opposed bearings —34— and —35— within the tube —11—, the bearing —34— being adjustable to take up wear and is locked in place by the cap —15— which is screwed upon the adjacent end of the tubular axle section —11—. The opposite or inner end of the rod —27—, or rather of the triangular frame of which the rod —27— forms a part, terminates in the ball —34'— which is seated in a socket —35'— on the end face of a revolving disk —36—, but at one side of its axis of revolution similar to the corresponding connection of the Simmons patent previously referred to although in Fig. 3, the ball and socket is shown directly over the axis. In other words, the angle of the triangular frame at the inner end of the tubular axle section —11— is eccentrically connected to the revolving element —36— which is coaxial with the tubular axle —11— so that as the disk —36— is revolved, the triangular frame is oscillated in the universal bearing —34— and transmits reciprocatory motion from the universal joint —28— to the knife-bar —23—. It is now clear that although the triangular actuated frame for the knife-bar has a lateral oscillatory movement, it is also adapted to swing vertically with the thrust-bar —19—, both swinging upon substantially the same axis co-incident with the axis of the traction wheel.

The finger-bar upon which the knife-bar is movable and thrust-bars —19—, by which the finger-bar is supported, may be raised and lowered through the medium of a rock-shaft —40— having eccentrics —41— connected by chains —42— to suitable clamps —43— on the thrust-bars, said eccentrics being also connected by springs —44— to anchors —45— on the main supporting frame, the springs serving to partially counter-balance the gravity of the finger-bar-supporting frame, and thereby facilitate the elevation of said finger-bar-supporting frame and parts carried thereby. The rock-shaft —40— is operated by suitable levers —46— secured thereto and arranged within easy reaching distance from a seat, as —47—, which latter is mounted upon and secured to the main supporting frame.

Secured to the brackets —21— are rearwardly extending parting blades —48— and upwardly and rearwardly extending grass fingers —49— and secured to the bars —19— are additional grass fingers —50—, which incline inwardly and rearwardly from their front ends to throw the top of the mowed grass or hay together between the wheels, in which position it is supported more or less in an upright position, and is therefore, more readily dried out or seasoned than would be possible if the grass were allowed to lie flatwise upon the ground.

The disk —36— is secured to a rotary shaft —51— having rigid thereon a pinion —51'— which meshes with a gear —52— on the superposed rotary shaft —53—. This latter shaft is provided with a sprocket-wheel —54— and is connected by a sprocket-chain —55— to a somewhat larger sprocket-wheel —56— on the shaft —57— running parallel with, but at the rear of the shafts —51— and —53—, the sprocket-chain —55— being tightened by a suitable idler —58—.

The sprocket —56— is preferably loose on the shaft —57— and is provided with a clutch section —58'— adapted to be thrown into and out of locking engagement with a companion clutch section —59— which is rigid on the shaft 57 and constitutes with the section —58'— an ordinary clutch. This shaft —57— is mounted in suitable bearings —69— on the main supporting frame and extends from side to side between the wheels, both ends being alike and derives rotary motion from the traction wheels —14— through the medium of sprocket wheels —61— and —62—, and a sprocket-chain —63—, each sprocket-wheel —61— being secured to and rotating with the adjacent traction - wheel —14— and is of somewhat greater diameter than the sprocket —62— which is rigidly secured to the shaft —57—, the sprocket-chain —63— being tightened by an adjustable idler —64—.

The shafts —51— and —53— are journaled in suitable bearings upon the cross-bars —9— of the main supporting frame and the shaft —57— is also mounted upon the main supporting frame, and therefore always bears a fixed relation thereto independently of the finger-bar and its supporting frame, and also independently of the knife-bar and its actuating frame. The finger-bar and knife-bar supported thereon are therefore free to rise and fall while traveling over undulating or uneven surfaces or obstructions without in any way affecting the speed of action of the knives, or that of its driving mechanism by reason of the fact that the thrust-bar —19— and its brace —20—, which carries the finger - bar and parts supported thereby, is entirely free and separate from the traction wheels and knife-bar-actuating mechanism directly connected thereto, which constitutes one of the essential features of my invention.

The disk —36— is rotated in the direction indicated by arrow —X—, and being eccentrically connected to the adjacent end of the triangular knife-bar operating frame at the junction of the bar —26— with the bar —27—, it is obvious that practically the entire strain of operation of the knife-bar is concentrated on the junction of the disk with said triangular frame, and in order that the disk may withstand the strain it is provided with a reinforcing thrust-bearing —65— on the side of the bearing —35'— opposed to the greatest resistance offered by the action of the triangular frame which reciprocates the knife-bar and forms the rigid side of a recess which receives the bearing —35'— for the ball —34—. This bearing —35'— is preferably split and is held between the rigid reinforcement —65— and adjustable take-up side —66—, best seen in Fig. 3, the latter being held in place by a clamping screw —67—.

The thrust-bars —19— which are hinged to the tubular axle-sections —11— and support at their front ends the finger-bar and parts carried thereby, are both loosely connected to their respective brackets —21— upon which the finger-bars are mounted so as to permit an easy flexing action between the connections of the finger-bars with the thrust-bars without straining the frame as either end of the finger-bar is raised and lowered irrespective of the other end in passing over uneven surfaces or obstructions.

What I claim is:

1. In a mowing machine of the class described, a main frame having tubular axle sections, wheels journaled on the axle sections, a floating frame also journaled upon the axle sections and movable independently of the main frame, a reciprocatory knife-bar mounted on the floating frame, and mechanism for transmitting motion from one of the traction wheels to the knife-bar.

2. In a mowing machine of the class described, a main frame provided with tubular axle sections spaced some distance apart end to end, wheels journaled on the axle sections, a floating frame also journaled upon the axle sections and movable independently of the main frame, a reciprocatory knife-bar mounted on the floating frame, an oscillatory frame connected to the knife bar and having one of its sides passing through one of the tubular axle sections, and mechanism for transmitting motion from one of the traction wheels to the oscillatory frame.

3. In a mowing machine of the class described, a main frame having axle sections, at least one of which is tubular, wheels journaled on the axle sections, a floating frame journaled on said axle sections and movable independently of the main frame, a reciprocatory knife-bar guided on the floating frame, an oscillatory frame connected to the knife-bar and having one of its sides supported within and extended through and beyond the ends of said tubular axle section, and mechanism for transmitting motion from at least one of the traction wheels to the oscillatory frame.

4. In a mowing machine of the class described, a main frame having axle sections, at least one of which is tubular, wheels journaled on the axle sections, a floating frame also journaled on the axle sections and movable independently of the main frame, a reciprocatory knife-bar mounted on the floating frame, an oscillatory frame bar passing entirely through and beyond the opposite ends of the tubular axle section, connections between the opposite ends of said frame-bar and knife-bar for actuating the latter, a revolving eccentric co-axial with the axis of the wheels and connected to the inner end of the oscillatory frame-bar, and mechanism for transmitting motion from at least one of the traction wheels to the eccentric.

5. In a mowing machine of the class described, a main frame and tubular axle sections secured thereto, traction wheels on said tubular sections, a floating finger-bar supporting frame hinged to the tubular sections, a reciprocatory knife-bar, a laterally oscillating triangular frame having one side passing through the tubular axle section and connected to the knife-bar for actuating the same, and mechanism mounted on the main frame separately from the finger bar supporting frame for transmitting motion from one of the traction wheels to the triangular frame.

6. In a mowing machine of the class described, a main frame and traction wheels, a finger-bar a supporting frame therefor hinged in the axis of the wheels and adapted to oscillate vertically, a knife-bar, a triangular frame having one side passing through the axis of the wheel and connected to the knife-bar to actuate the same, said triangular frame being adapted to oscillate laterally and vertically and mechanism actuated by one of the traction wheels for transmitting lateral oscillating movement to said triangular frame, said mechanism being in fixed relation to the main frame and independent of the finger-bar supporting frame.

7. In a thrust cut mowing machine, a main supporting frame, traction wheels, a floating frame hinged to the main frame, a knife-bar slidable on the floating frame, a triangular frame having one of its sides passing through the hub of one of the wheels, a shaft mounted on the main frame independently of the floating frame, means for transmitting rotary motion from one of the traction wheels to said shaft, and additional means for transmitting oscillatory motion from said shaft to the triangular frame.

8. In combination with the main supporting frame and traction wheels of a center draft thrust cut mowing machine, a floating frame hinged to the main frame and having its swinging axis coincident with that of the traction wheels, a laterally oscillatory frame having one side passing through the hub of one of the wheels, a knife-bar actuated by said oscillating frame, a rotary driven element mounted upon the main frame separately from the floating frame, means for transmitting rotary motion from one of the traction wheels to said rotary element, and additional means for transmitting motion from said element to the oscillating frame.

9. In combination with the main frame and traction wheels of a center-draft mowing machine, a knife-bar and floating support therefor hinged to the frame, a vibratory triangular frame having one side passed through the axis of one of the wheels and having its front end connected to the knife-bar, a rotary eccentric for vibrating the triangular frame, a shaft mounted on the main frame, means for transmitting motion from the shaft to the eccentric, and additional means separate from the floating support for transmitting rotary motion from one of the traction wheels to said shaft.

10. In a center draft thrust cut mowing machine, a main supporting frame, separate coaxial tubular axial sections secured in opposite ends of the frame, and spaced apart at their meeting ends, traction wheels journaled on said axle sections, a floating knife-bar support also journaled upon said tubular axle sections, a knife-bar slidable on said floating support, a laterally oscillating triangular frame having one side passed axially through one of the tubular axial sections and its opposite angle connected to the knife bar, a rotary disk between the inner ends of the axle sections and provided with an eccentric bearing for the adjacent angle of the triangular frame for oscillating the latter, and means mounted on the main supporting frame separately from the floating frame for transmitting motion from one of the traction wheels to the disk.

In witness whereof I have hereunto set my hand this 12th day of November 1906.

WILLIAM E. GILROY.

Witnesses:
 FRANK OWENS,
 THOMAS E. WOLFENDEN.